United States Patent [19]

Peuterbaugh

[11] Patent Number: 4,508,475
[45] Date of Patent: Apr. 2, 1985

[54] BORING AND GROOVING TOOL STRUCTURE AND METHOD

[75] Inventor: Bruce G. Peuterbaugh, Mt. Clemens, Mich.

[73] Assignee: J. P. Tool, Mich.

[21] Appl. No.: 307,388

[22] Filed: Oct. 1, 1981

[51] Int. Cl.³ .............................................. B23B 7/00
[52] U.S. Cl. ................................... 408/153; 408/158; 82/1.2
[58] Field of Search .................. 408/22, 59, 153, 154, 408/157, 158, 168, 169, 170, 146, 147, 160; 82/1.2, 1.4, 2 E

[56] References Cited

U.S. PATENT DOCUMENTS

| | | | |
|---|---|---|---|
| 2,038,611 | 4/1936 | Simonson | 408/158 |
| 2,247,283 | 6/1941 | Young | 82/1.2 |
| 2,247,284 | 6/1941 | Young | 82/1.2 |
| 2,350,778 | 6/1944 | Lang | 82/1.2 |
| 3,530,745 | 9/1970 | Milewski | 408/158 |
| 3,853,422 | 12/1974 | Benjamin et al. | 408/179 |
| 4,004,332 | 1/1977 | Wawrzyniak | 408/59 |

FOREIGN PATENT DOCUMENTS 2405694 8/1975 Fed. Rep. of Germany ...... 408/158

Primary Examiner—Z. R. Bilinsky
Assistant Examiner—Daniel W. Howell
Attorney, Agent, or Firm—Barnes, Kisselle, Raisch, Choate, Whittemore & Hulbert

[57] ABSTRACT

Structure for and method of mounting and actuating a spring loaded drawbar actuated boring and grooving tool on a spindle which spindle includes a machine tool hydraulically actuated drawbar therein, wherein there is no positive connection between the spring loaded boring and grooving tool drawbar and the machine tool drawbar, facilitating angular alignment of the boring and grooving tool and spindle with the boring and grooving tool in surface to surface contact with the spindle. The spring loaded drawbar is resiliently urged toward the machine tool hydraulically actuated drawbar to actuate grooving bits on the boring and grooving tool.

Leakage of air under pressure between the drawbars is sensed as an indication of a worn or broken grooving tool.

Guiding and assuring concentricity of the grooving bits is accomplished from the outer end of the boring and grooving tool by rectangular boring bits secured in angularly spaced apart relation around the outer periphery of an end cap.

6 Claims, 7 Drawing Figures

BORING AND GROOVING TOOL STRUCTURE AND METHOD

BACKGROUND OF THE INVENTION

1. Field of the Invention

The invention relates to a structure for and method of installation of boring and grooving tools having spring loaded boring and grooving tool drawbars or actuating members therein on machine tool spindles having machine tool hydraulically actuated drawbars or actuating members therein, sensing of broken or worn bits such as grooving bits on the boring and grooving tool, and the guiding and maintaining of concentricity of bits such as grooving bits on the boring and grooving tool.

More specifically, the invention refers to structure for securing a boring and grooving tool having a spring loaded boring and grooving tool actuating member therein to a machine tool spindle having a hydraulically actuated actuating member therein, wherein there is no positive connection between the actuating members so that angular alignment of the boring and grooving tool on the spindle to permit securing of the boring and grooving tool to the spindle is facillitated and the securing of the boring and grooving tool to the spindle is always with the boring and grooving tool flush with the spindle.

The structure of the invention further includes means for measuring escaping air under pressure between the machine tool hydraulically actuated actuating member and an extension of the boring and grooving tool spring loaded actuating member for indicating broken or worn grooving bits on the boring and grooving tool, and means for guiding and maintaining concentricity of the grooving bits in operation of the boring and grooving tool from the outer end of the boring and grooving tool.

The method of the invention includes the securing of the boring and grooving tool flush with the spindle without positive connection between the actuating members. The method of the invention further includes the sensing of air escaping between the extension of the boring and grooving tool spring loaded actuating member and the machine tool hydraulically actuated actuating member to indicate a broken or worn grooving bit and guiding and maintaining concentricity of the grooving bits from the outer end of the boring and grooving tool.

2. Description of the Prior Art

In the past, boring and grooving tools having actuating member therein movable axially within the boring and grooving tool and operable to move cutting tools such as grooving bits radially of the boring and grooving tool in response to such axial movement have been mounted on machine tool spindles having machine tool actuating members extending axially therethrough by first making a threaded connection between the boring and grooving tool actuating member and the machine tool actuating member until the boring and grooving tool body made flush contact with the spindle, at which time the boring and grooving tool was backed off from the spindle sufficient to align bolt openings in the boring and grooving tool body member and spindle. The boring and grooving tool was then secured to the spindle without being exactly flush with the spindle.

With such prior structure, the positive connection between the boring and grooving tool actuating member and the machine tool hydraulically actuated actuating member required exact positioning of the machine tool actuating member during operation so that the grooving bits secured to the boring and grooving tool would be moved radially an exact amount. Such positioning of the machine tool hydraulically actuated actuating member in relation to the boring and grooving tool and grooving bits on the boring and grooving tool required a good deal of time in the past such that boring and grooving tools were not changed except as absolutely necessary and cutting tools such as grooving bits have been adjusted and/or replaced with the boring and grooving tool in assembly on a machine tool spindle. This requires a good deal of downtime for the machine tool during adjusting and replacing of cutting tools as well as promoting the use of cutting tools which are not as sharp as desirable. Furthermore, cutting tools such as grooving bits can be more accurately set in less time off the machine tool to close diameter tolerance so that they will cut to proper size without on the machine adjustments.

Further, in the past there has been no simple method of determining wear of grooving bits on the boring and grooving tool or of sensing a broken grooving bit during operation. Worn grooving bits have in the past generally been determined after gauging of parts produced thereby which particularly in high speed operations may be several parts after the critical wear point has been reached. Further, in the past the positive connection between the machine tool hydraulically actuated actuating member and spring loaded boring and grooving tool actuating member has permitted bending and/or breaking of grooving bits due to excessive hydraulic pressure applied thereto through the machine tool hydraulically actuated actuating member. Bending or breaking of the grooving bits by such excessive pressure again produces undesirable scrap. Also, in the past, wherein boring of openings has been accomplished with triangular boring bit inserts on the end of the boring and grooving tool prior to actuation of grooving bits in the bore cut thereby, the bore is sometimes undercut and the grooving bits may not have the required concentricity and may not be properly guided, at least not from the outer end of the boring and grooving tool.

SUMMARY OF THE INVENTION

In accordance with the invention, there is provided a structure for and method of securing a boring and grooving tool including a spring loaded boring and grooving tool actuating member to a machine tool spindle having a hydraulically actuated actuating meember whereby the boring and grooving tool may always be secured flush to the spindle in angular alignment therewith.

Further, in accordance with the invention there is provided a structure for and method of sensing a worn or broken grooving bit or the like on the boring and grooving tool during operation of the boring and grooving tool and means for guiding and aligning grooving bits on the boring and grooving tool from the outer end of the boring and grooving tool.

In accordance with the structure of the invention, the spring loaded boring and grooving tool actuating member of the boring and grooving tool is resiliently urged toward the hydraulically actuated actuating member of the machine tool in a direction to urge cutting tools such as grooving bits radially outwardly of the boring and grooving tool. No positive connection is provided between the spring loaded boring and grooving tool actuating member and the hydraulically actuated actuating member of the machine tool, whereby axially positioning of the actuating member of the machine tool is no critical.

Structure is also provided for sensing escape of air under pressure between the hydraulically actuated actuating member of the machine tool and an extension of the spring loaded actuating member of the boring and grooving tool to indicate a broken or worn grooving bit in operation.

In addition, an end cap is provided on the outer end of the boring and grooving tool including rectangular boring bits thereon operable to provide a finished bore prior to internal grooving thereof, which boring bits guide and assure concentricity of the grooving bits.

The method of the invention includes always securing the boring and grooving tool to the spindle flush therewith with no positive connection between the actuating member of the boring and grooving tool and the hydraulically actuated actuating member of the machine tool.

The method further includes the sensing of air escaping between the hydraulically actuated actuating member of the machine tool and an extension of the spring loaded actuating member of the boring and grooving tool resiliently urged toward the machine tool hydraulically actuated actuating member as an indication of a broken or worn grooving bit and the guiding and alignment of the grooving bits from the outer end of the boring and grooving tool.

DESCRIPTION OF THE PREFERRED EMBODIMENT

Figure 1:
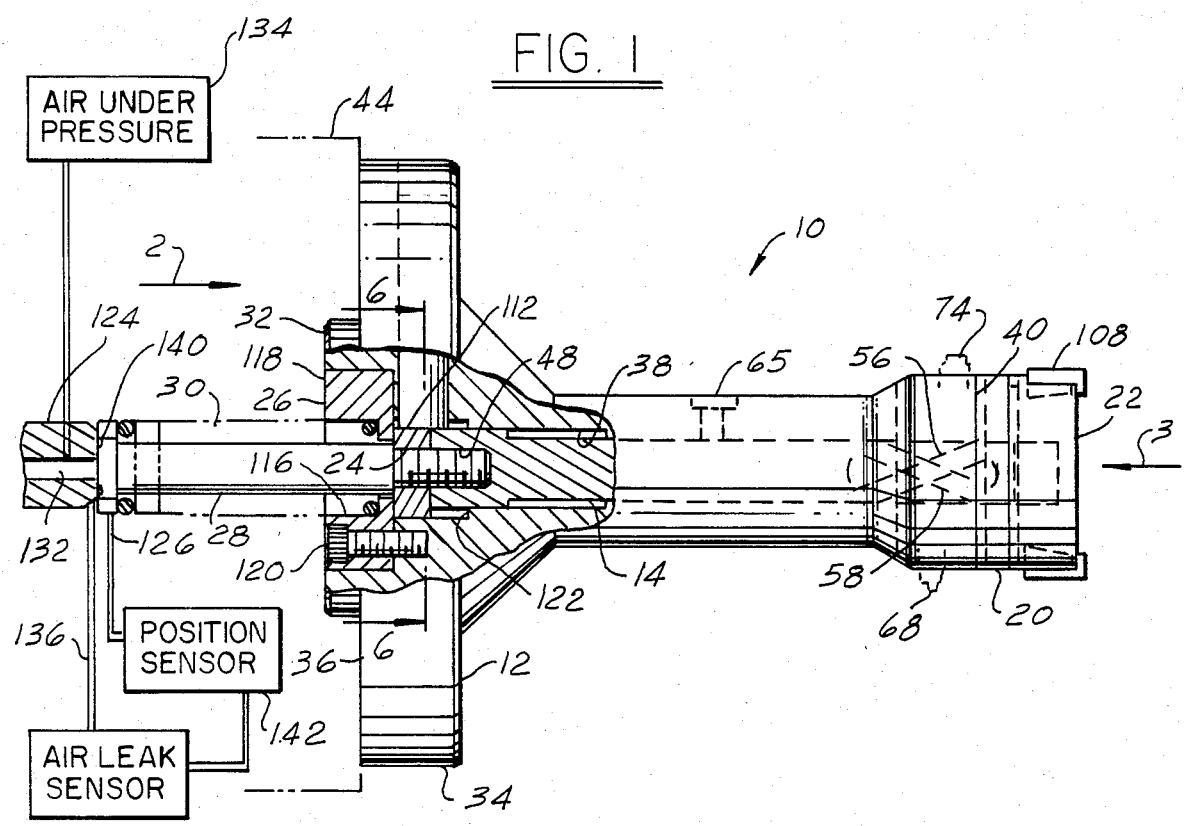
FIG. 1 is a partially broken away elevation view of a boring tool constructed in accordance with the invention for practicing the method of the invention.
Figure 2:
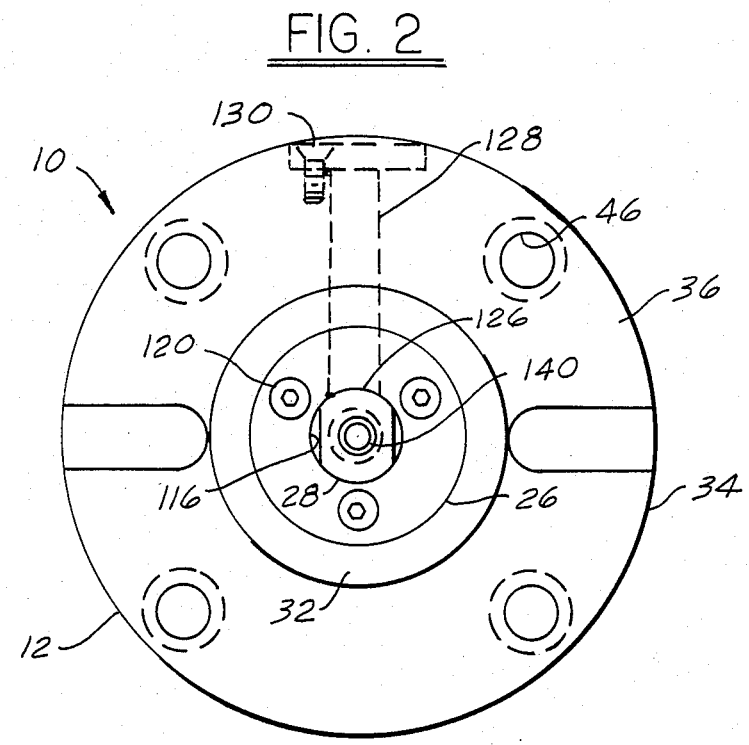
FIG. 2 is an elevation of one end of the boring and grooving tool shown in FIG. 1, taken in the direction of arrow 2 in FIG. 1.
Figure 7:
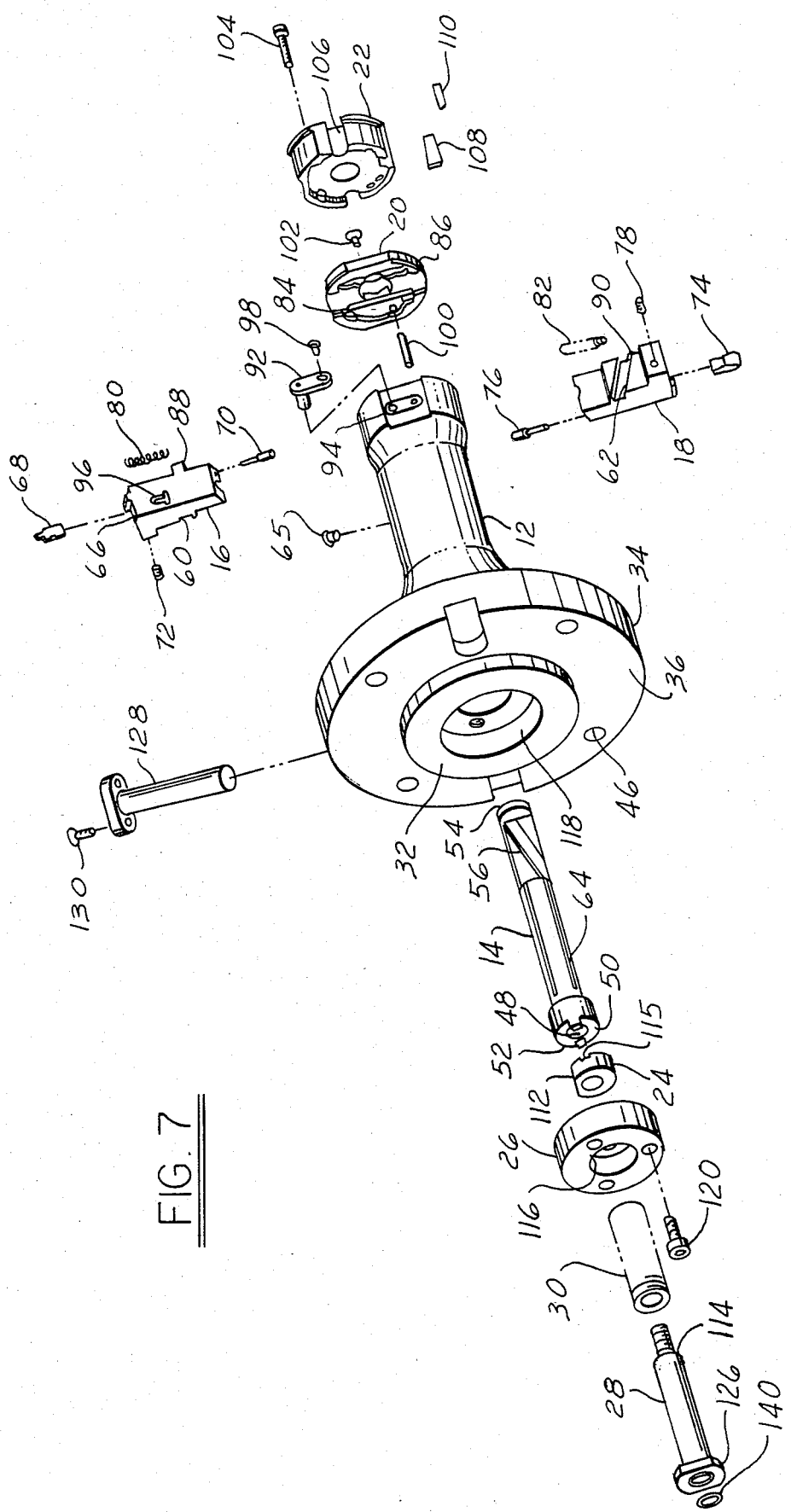
FIG. 7 is an exploded perspective view of the boring and grooving tool shown in FIGS. 1–6.

As shown best in FIG. 1, the boring and grooving tool 10 of the invention includes a body member 12, a grooving tool actuating member 14, slides 16 and 18 best shown in FIG. 7, slide retainer 20, and end cap 22. The boring and grooving tool 10 further includes the washer 24, end plate 26, bolt 28 and spring 30.

Figure 4:
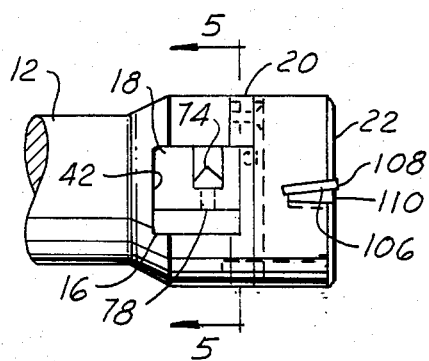
FIG. 4 is a partial elevation view of the right end of the boring and grooving tool shown in FIG. 1 rotated at 90° with respect to the boring and grooving tool illustrated in FIG. 1.
Figure 5:
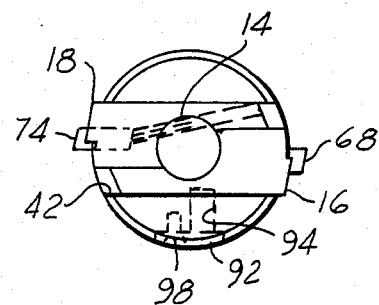
FIG. 5 is a cross section of the boring and grooving tool of the invention positioned as shown in FIG. 4, taken substantially on the line 5—5 in FIG. 4.
Figure 6:
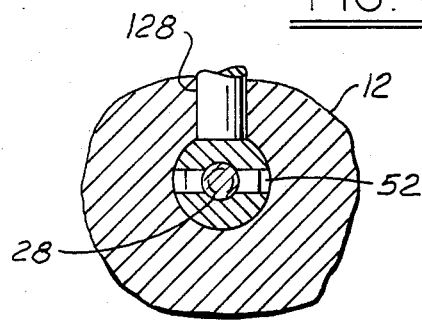
FIG. 6 is a broken cross section of the boring and grooving tool shown in FIG. 1, taken substantially on the line 6—6 in FIG. 1.

The body member 12 includes the centering ring 32 and mounting flange 34 on the inner end 36 thereof. A multiple diameter bore 38 extends the length of the body member 12 as shown best in FIG. 1. The enlarged diameter outer end 40 of the body member 12, includes the axially extending slot 42 best shown in FIG. 4, extending across the outer end of the bore 38 for receiving the slides 16 and 18. In assembly, the body member 12 is secured to the spindle 44 of a machine tool by convenient means such as bolts (not shown) extending through the openings 46 in in the mounting flange 34.

As shown, the boring and grooving tool actuating member 14 has a threaded opening 48 in the inner end 50 thereof. The end 50 of the boring and grooving tool actuating member 14 further includes the aligning tabs 52 thereon as shown best in FIG. 7. The other end 54 of the boring and grooving tool actuating member 14 is provided with inclined camming surfaces 56 and 58 on the opposite sides thereof cooperable with camming surfaces 60 and 62 in recesses in the slides 16 and 18 to move the slides 16 and 18 radially of boring and grooving tool 10 on axial movement of the actuating member 14. Lubricating grooves 64 extend axially of the boring and grooving tool actuating member 14 and are spaced angularly thereabout to receive lubricant from fitting 65 as required, as shown best in FIG. 7.

The slide 16 has an opening 66 therein for receiving a grooving bit 68. An adjusting screw 70 is provided in the other end of the opening 66 for adjusting the grooving bit 68 radially of the boring and grooving tool 10. After the grooving bit 68 is adjusted, a set screw 72 is provided to secure the grooving bit 68 in it adjusted position.

Both slides 16 and 18 are similar. Thus, the slide 18 receives the grooving bit 74, adjusting screw 76 and set screw 78 operably associated therewith.

In assembly as shown in FIG. 1, the slides 16 and 18 are positioned in the slot 42 in the end 40 of the body member 12, with the camming surfaces 56 and 58 in engagement with the camming surfaces 60 and 62 on the slides 16 and 18, whereby on axial movement of the actuating member 14 in the bore 38, the slides 16 and 18 and thus the adjusted grooving bits 68 and 74 associated therewith are moved radially of the boring and grooving tool 10 in accordance with the axial position of the actuating member 14 in the bore 38. The slides 16 and 18 are biased in a retracted direction by means of the springs 80 and 82 positioned in slots 84 and 86 provided therefore in the slide retainer 20. The springs 80 and 82 are operable between tabs 88 and 90 on the slides 16 and 18 at one end thereof and the slide retainer 20 at the other end thereof. The limits of movement of the slides 16 and 18 are set by the key dowel 92 shown best in FIG. 7 extending through the opening 94 in the body member 12 of the boring and grooving tool 10 and into the elongated slot 96 in the slide 16. The key dowel 92 is secured to the body member 12 by convenient means such as the screw 98.

The slide retainer 20 is positioned on, piloted and secured to the end 40 of the body member 12 by convenient means such as dowel 100 and screw 102.

Figure 3:
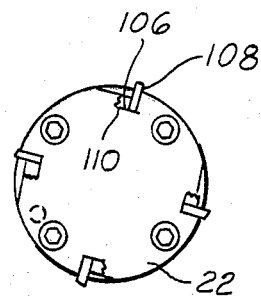
FIG. 3 is an end view of the other end of the boring and grooving tool shown in FIG. 1, taken in the direction of the arrow 3 in FIG. 1.

End cap 22 is secured to the end 40 of the body member 12 through member 20 by convenient means such as screws 104. Recesses 106 are angularly spaced about the end cap 22 as shown best in FIG. 3 to receive rectangular boring bits 108 which are held in the recesses 106 by convenient means such as serrated wedges 110, or any wedge and clamp fasteners.

The end 50 of the actuating member 14, as shown in FIGS. 1 and 7, is radially enlarged, and a washer 24 having a diameter larger than the radially enlarged end 50 of the actuating member 14 and including one flat side 112, and a groove 115 in one thereof is secured to the end 50 of the actuating member 14 by means of the shoulder 114 on the bolt 28.

The end plate 26 having the recess 116 therein is secured in the recess 118 in the body member 12 by convenient means such as bolt 120. With the end plate 26 in position, the axial travel of the actuating member 14 in the passage 38 is limited by the washer 24 engaging the end plate 26 in one direction and the shoulder 122 in the passage 38 in the other direction.

The bolt 28 and thus the washer 24 and actuating member 14 rigidly secured thereto are biased toward the machine tool actuating member 124 by the spring 30 operable between the head 126 of the bolt 28 and the end plate 26 within the recess 116, as shown best in FIG. 1.

A retaining member 128 extends radially through the flange 34 of the body member 12 to engage the flat side 112 of the washer 24 to prevent rotation of the actuating member 14 in the passage 38. The retaining member 128 is secured in the body member 12 by convenient means such as screw 130.

As shown, the machine tool actuating member 124 is provided with a bore 132 extending axially therethrough whichis connected to a source of air under pressure 134. Further, the air pressure exterior of the machine tool actuating member 124 is monitored through passage 136 by air pressure sensing structure 138. The air pressure sensing structure 138 thus provides an indication of leakage of the air under pressure from the passage 132 radially outwardly between the engaged end of the actuating member 124 and the head 126 of the bolt 28. As will be seen subsequently, such leakage of air may be used to monitor the condition of the grooving bits 68 and 74.

If desired, sealing means generally indicated 140 may be provided in the end of bolt 28 operable to seal between the machine tool boring bar and the head of the bolt 28.

Further, in accordance with the invention a sensor 142 is provided to sense the last portion of the movement of the bolt 28 in operation of the boring and grooving tool 10. As will be seen subsequently, the information from the position sensing structure 142 is utilized to cause the air pressure sensing structure 138 to disregard leakage of air between the machine tool actuating member 124 and the bolt head 126 in the last portion of the movement of the bolt 28.

In the method of installation of the boring and grooving tool 10, the boring and grooving tool 10 as shown in FIGS. 1-6, is positioned on the spindle 44 of a machine tool with the actuating member 124 of the machine tool retracted, that is, positioned to the left in FIG. 1. Thus, the surface 36 of the body member 12 will always be in intimate surface to surface contact with the surface 37 of the spindle 44 since no backing off of a threaded connection between the actuating member 124 and the actuating member 14 is necessary to permit alignment of openings 46 in the boring and grooving tool 10 and similar threaded openings in the spindle 44.

No positive connection is made between the actuating member 14 or the extension thereof including the bolt 28 and the machine tool actuating member 124 in the installation of the boring and grooving tool 10.

In operation then, the spindle 44 may be moved to the right or a workpiece may be moved to the left to cause boring of the workpiece by the rectangular boring bits 108 on the end cap 22.

Before this boring operation, the actuating member 124 is moved to the right to move the boring and grooving tool actuating member 14 to the right so that the washer 112 abuts the shoulder 122 in the passage 28. The grooving bits 68 and 74 will thus be retracted during the initial boring operation by moving of the slides 16 and 18 radially inwardly of the slot 42 in the end 40 of the body member 12.

When boring of the workpiece is at the desired depth, the machine tool actuating member 124 is moved to the left in FIG. 1 at a controlled rate. The boring and grooving tool actuating member 14 is then moved to the left under the bias of the spring 30 to move the slides 16 and 18 radially outwardly of the body member 12 to radially feed the grooving bits 68 and 74. Desired grooves are thus cut in the workpiece as the washer 24 on the actuating member 14 is moved into engagement with the end plate 26.

After the grooves have been cut in the workpiece, the machine tool actuating member 124 is again moved to the right to move the boring and grooving tool actuating member 14 to the right to positively retract the grooving bits 68 and 74 so that the boring and grooving tool 10 and the workpiece can be separated.

During the cutting of the grooves in the workpiece, the grooving bits 68 and 74 are guided and held concentric by the rectangular boring bits 108 secured on the outer end 40 of the boring and grooving tool 10 by the end cap 22. Due to the length of the cutting surface of the boring bits 108 and the angle at which they are engaged with the opening bored in the workpiece, no undercutting will occur in the workpiece caused by the boring bits 108.

If during the retraction of the machine tool actuating member 124 to the left as shown in FIG. 1, the grooving bits 68 and 74 are not fed into the workpiece fast enough due to the dulling of the grooving bits 68 and 74, or damage thereto as by breaking a grooving bit, the bolt head 126 will not be allowed to follow the retraction of the machine tool actuating member 124 fast enough to maintain the seal between the end of the machine tool actuating member 124 and the head 126 of the bolt 28, whereby the air under pressure in the passage 132 in the machine tool actuating member 124 will escape between the machine tool actuating member 124 and the head 126 of the bolt 28 and may be used to provide an indication of a worn or broken cutting tool through the air pressure sensor 138.

Since it is desired to permit the washer 112 to contact the end plate 26 to insure proper depth of the grooves being cut in the workpiece, and since it is desired that the rest position or limiting position of the machine tool actuating member 124 is not critical, the machine tool actuating member 124 is allowed to move a very short distance to the left after the last travel of the bolt 28 to the left permitted, whereby some air pressure is lost from the passage 132 in the machine tool actuating member 124. Since this loss of air pressure is not caused by a worn or broken grooving tool, the position sensor 142 is provided to sense the last portion of the movement of the bolt 28 and to provide a signal to the air pressure sensor 138 to cause it to disregard the leakage of air from the passage 132 during the last movement of the bolt 28.

While one embodiment of the present invention has been considered in detail, it will be understood that other embodiments and modifications of the invention are contemplated. It is the intention to include all the embodiments and modifications of the invention as are defined by the appended claims within the scope of the invention.

I claim:

1. A boring and grooving tool comprising a body member having a multiple diameter bore therethrough, a boring and grooving tool actuating member positioned within the bore, slides positioned in the body member across one end of the bore therethrough, means operable between one end of the boring and grooving tool actuating member and slides for moving the slides radially on axial movement of the boring and grooving tool actuating member within the bore, a washer having a diameter larger than the diameter of the boring and grooving tool actuating member secured to the actuating member in the other end of the bore within one diameter of the bore cooperable with a radially extending surface within the bore to limit the movement of the boring and grooving tool actuating member within the bore in one direction, an end plate secured over said other end of the bore through said body member engageable with said washer to limit axial movement of the boring and grooving tool actuating member in the other direction, a recess in the end plate in the side thereof opposite the washer, a headed bolt extending through the end plate and washer and into the other end of the boring and grooving tool actuating member having an annular abutment thereon engaged with the washer to secure the washer to the other end of the boring and grooving tool actuating member and resilient means positioned between the head of the bolt and the end plate within the recess therein for urging the washer into engagement with the end plate, the tool actuating member toward the other end of the bore therethrough and the slides into an extended position whereby the tool may be mounted flush on a spindle of a machine tool and the head of the bolt engaged with a machine tool actuating member to move the slides radially outwardly on movement of the machine tool actuating member away from the bolt to move the washer toward the end plate.

2. Structure as set forth in claim 1, wherein the washer has one flat side spaced from the center of the washer a distance substantially equal to the diameter of the boring and grooving tool actuating member at its closest point to the center of the washer, a retaining member extending radially through the body member toward the washer and into engagement with the flat side of the washer, recesses in the side of the washer away from the end plate and tabs on the other end of the boring and grooving tool actuating member extending within the recesses in the washer to prevent rotation of the tool actuating member within the bore through the body member.

3. Structure as set forth in claim 1, and further including means secured to the body member over the one end of the bore therethrough for centering and guiding the boring and grooving tool during grooving therewith.

4. Structure as set forth in claim 3, wherein the means for centering and guiding the tool during grooving therewith includes an end cap extending over the one end of the bore through the body member having angularly spaced apart, radially extending elongated rectangular boring bits secured thereto and extending axially thereof.

5. A boring and grooving tool comprising a body member having a multiple diameter bore therethrough, a boring and grooving tool actuating member positioned within the bore, slides positioned in the body member across one end of the bore therethrough, means operable between one end of the boring and grooving tool actuating member and slides for moving the slides radially on axial movement of the boring and grooving tool actuating member within the bore, a washer having a diameter larger than the diameter of the boring and grooving tool actuating member secured to the actuating member in the other end of the bore within one diameter of the bore cooperable with a radially extending surface within the bore to limit the movement of the boring and grooving tool actuating member within the bore in one direction, an end plate secured over said other end of the bore through said body member engageable with said washer to limit axial movement of the boring and grooving tool actuating member in the other direction, a recess in the end plate in the side thereof opposite the washer, a headed bolt extending through the end plate and washer and into the other end of the boring and grooving tool actuating member having an annular abutment thereon engaged with the washer to secure the washer to the other end of the boring and grooving tool actuating member, and resilient means positioned between the head of the bolt and the end plate within the recess therein for urging the washer into engagement with the end plate, the tool actuating member toward the other end of the bore therethrough and the slides into an extended position whereby the tool may be mounted flush on a spindle of a machine tool and the head of the bolt engaged with a machine tool actuating member to move the slides radially outwardly on movement of the machine tool actuating member away from the bolt to move the washer toward the end plate, wherein the washer has one flat side spaced from the center of the washer a distance substantially equal to the diameter of the boring and grooving tool actuating member at its closest point to the center of the washer, a retaining member extending radially through the body member toward the washer and into engagement with the flat side of the washer, recesses in the side of the washer away from the end plate, and tabs on the other end of the boring and grooving tool actuating member extending into the recesses in the washer to prevent rotation of the boring and grooving tool actuating member within the bore through the body member and further including means secured to the body member over the one end of the bore therethrough for centering and guiding the boring and grooving tool during grooving therewith.

6. Structure as set forth in claim 5, wherein the means for centering and guiding the tool during grooving therewith includes an end cap extending over the one end of the bore through the body member having angularly spaced apart, radially extending elongated rectangular boring bits secured thereto and extending axially thereof.

* * * * *